United States Patent [19]

Masclet et al.

[11] 4,284,255

[45] Aug. 18, 1981

[54] SHOCK ABSORBERS AND SHOCK ABSORBER STRUTS, NOTABLY FOR AERODYNE LANDING GEAR

[75] Inventors: Jean Masclet, Paris; Jacques Veaux, Chatillon, both of France

[73] Assignee: Messier-Hispano-Bugatti (SA), Montrouge, France

[21] Appl. No.: 117,657

[22] Filed: Feb. 1, 1980

[30] Foreign Application Priority Data

Feb. 6, 1979 [FR] France .................. 79 02965

[51] Int. Cl.³ .......................................... B64C 25/22
[52] U.S. Cl. ...................... 244/102 R; 244/102 SS; 244/104 FP
[58] Field of Search .......... 244/17.17, 104 FP, 102 R, 244/102 SS; 267/8 R, 8 A, 64 R, 64 B, 126

[56] References Cited

U.S. PATENT DOCUMENTS

| | | | |
|---|---|---|---|
| 2,171,827 | 9/1939 | Elliott | 267/8 R |
| 2,713,401 | 7/1955 | Serste et al. | 188/136 X |
| 3,140,084 | 7/1964 | Schmidt | 244/104 FP X |
| 4,082,255 | 4/1978 | Masclet et al. | 267/64 R |
| 4,088,286 | 5/1978 | Masclet et al. | 244/104 FP X |

FOREIGN PATENT DOCUMENTS

| | | | |
|---|---|---|---|
| 2853589 | 6/1979 | Fed. Rep. of Germany | 267/8 A |
| 321035 | 10/1929 | United Kingdom | 244/104 FP |

*Primary Examiner*—William A. Cuchlinski, Jr.
*Attorney, Agent, or Firm*—McAulay, Fields, Fisher, Goldstein & Nissen

[57] ABSTRACT

Shock absorbers and shock absorber jacks each of which comprises a shaft containing a low-pressure chamber and sliding in a first chamber of a first cylinder which is separated from another or second chamber which contains a high-pressure chamber, by means of a partition which is traversed by a grooved shaft borne by a separator piston in the other chamber and guided in a sleeve borne by the partition. In the event of the penetration of the shaft into the first cylinder at a rate of very much higher than normal, then the two grooves in the shaft communicate with each other and permit the flow of oil from the first chamber towards the second chamber and towards the low-pressure chamber because of a radial passage through the sleeve near the partition.

12 Claims, 3 Drawing Figures

SHOCK ABSORBERS AND SHOCK ABSORBER STRUTS, NOTABLY FOR AERODYNE LANDING GEAR

BACKGROUND OF THE INVENTION

The subject of the invention is improvements in shock absorbers and shock absorber jacks, particularly of the type equipping aerodyne landing gears.

Many shock absorbers of this type are already known, which comprise a shock absorber shaft mounted to slide in a shock absorber cylinder, either or both of these components containing one or two chambers of gas under pressure, serving as a pneumatic spring returning the device to the position of equilibrium after damping the displacement of the shaft in the cylinder, resulting in a dissipation of energy by throttling a hydraulic fluid through orifices calibrated for normal landing speeds, on the order of 3 m/s, making it possible to absorb the energy on impact.

Some of these known devices also comprise valves equipped with throttling orifices with a variable section depending on the rate of penetration or the direction of passage of the fluid, as well as means for braking at the end of the expansion of the shock absorber, in order to make the latter effective as the aerodyne taxis over unprepared ground or over paved runways, or to absorb certain peaks of force; in order to absorb the effect of the resonance phenomenon on the ground, which manifests itself on helicopters at the limit of lift, just before take-off, and in order to prevent the device from extending abruptly, with a shock when it reaches the end of its expanded position.

But these known devices prove not to be adapted to emergency or crash landings of the aerodyne, at vertical speeds on the order of 10 to 12 m/s, for which the compression throttling orifices appear to be undersized, so that the shock absorber behaves as a quasi-rigid element, transmitting to the structure of the aerodyne the entirety of the forces which it receives, causing the destruction of the aerodyne or the destruction of the shock absorber, next to that of the aerodyne.

Furthermore, shock-absorber jacks are known, which can bring the undercarriages either into retracted position when the aerodyne is in flight, in lowered position for landing and taxiing, as well as into extra-low position to facilitate storage of the aerodyne in a hangar, accessibility to certain parts of the aerodyne, anchoring it in its parking space, etc. The shock-absorber jacks described in French Pat. Nos. 76/03126 and 76/33261 both of which correspond to U.S. Pat. No. 4,088,286, comprise a shock absorber that can be of the type presented above, mounted at the end of a jack shaft, in which a first chamber serves as a cylinder for the shock absorber, and is, in itself, integral with a jack piston mounted to slide in a jack cylinder, with which the piston defines a chamber operating the lowering of the landing gear when it is fed with hydraulic fluid, and operating the extra-low positioning when it is emptied, with no change in the load on the shock absorber. Furthermore, a lifting piston mounted to slide in a second chamber in the jack shaft, separated from the first, and constituting a landing-gear lifting chamber, makes it possible to load the shock absorber by pulling the shaft of the latter toward the interior of the jack shaft, when this second chamber is fed with hydraulic fluid, and the lowering chamber is emptied, which brings the undercarriage into retracted position. A mechanical locking device, for example of the claw or hydraulic type, comprising a hydraulic locking valve with controlled opening, is also provided to lock the jack shaft in extended position relative to the jack cylinder, after filling the lowering chamber. In the case of a hydraulic device, an excess-pressure valve disposed at the bottom of the lowering chamber permits a prolongation of the stroke by emptying the lowering chamber in case of a crash. But this solution has the drawback that the possible stroke of the shock absorber is not used to the best in absorbing a supplementary part of the crash energy.

SUMMARY OF THE INVENTION

The problem which is to be solved by the present invention consists in designing improved shock absorbers and shock-absorber jacks capable of absorbing a fraction of the crash energy which can be three to four times as great as the maximum normal energy absorbed for normal landing speeds, this fraction of the crash energy being, in turn absorbed at speeds three to four times greater than the normal speeds, and the supplementary fraction of the crash energy being absorbed by the structure of the aerodyne supporting the shock absorbers or shock-absorber jacks.

With this in mind, the shock absorber according to the invention, of the type comprising a shock-absorber shaft containing a low-pressure, elastic return chamber, and mounted to slide in leakproof fashion inside a first chamber, filled with hydraulic fluid, of a cylinder, the end of the shaft inside the cylinder bearing a piston guided on the outer face of a first sleeve, integral with a first transverse wall of the cylinder, separating the first chamber from a second chamber of the cylinder, in which a separator piston, mounted to slide in a leakproof fashion, separates a high-pressure elastic return chamber from a volume of hydraulic fluid, the piston of the shock-absorber shaft defining, with the sleeve, at least one permanent compression-throttling orifice, is characterized in that the separator piston bears a grooved shaft, passing through the first transverse wall of the cylinder and guided in the interior of the first sleeve, the base of which has a radial passage with a section very much larger than that of the permanent, compression-throttling orifice or orifices, so that in the event of penetration of the shock-absorber shaft into the cylinder, at a rate very much higher than that for which the permanent, compression-throttling orifice or orifices were calibrated, the separator piston is displaced against the high-pressure elastic return chamber, while uncovering orifices for passage of the hydraulic fluid, defined by the grooves in the grooved shaft and conditioned for the rate of penetration of the shaft into the cylinder.

In so doing, a prolonged-stroke device is obtained, which permits an absorption energy supplementary to that obtained by the known devices. Moreover, if the grooved shaft is guided by a shoulder inside the first sleeve, and has a first longitudinal groove which, following a displacement of the separator piston in compression, comes opposite the shoulder and defines with it, an orifice permitting the free passage, toward the low-pressure return chamber, of the hydraulic fluid from the first chamber of the cylinder, flowing through the radial passage at the base of the first sleeve, a force-limiting device is obtained in which the entire possible stroke of the shock-absorber shaft in the first chamber of the cylinder, is utilized, the volume of hydraulic fluid corresponding to the volume of the shock-absorber shaft which has penetrated into the first chamber, being transferred into the shock-absorber shaft while loading the low-pressure elastic return chamber.

According to a simple structure, at least one of the permanent compression-throttling orifices is constituted by the cooperation of the piston of the shock-absorber shaft and a longitudinal groove on the outer face of the first sleeve, the free end of which is shaped as an expanded head, pierced with at least one permanent orifice for free passage of the hydraulic fluid, and guided on the inner face of the shock-absorber shaft.

In a first particular form of embodiment, limited to a suspension shock-absorber that cannot fulfill the function of a raising or super-lowering jack, the grooved shaft has, at its base, a second longitudinal groove, whereof the end nearest the separator piston permits, in the expanded position of the shock-absorber, communication by means of the radial passage in the first sleeve, between the first chamber of the cylinder and the volume of hydraulic fluid in the second chamber, so that for compression loads higher than the normal loads, the separator piston and the grooved shaft are displaced, and the second groove extends on either side of the first transverse partition, to favor the flow of hydraulic fluid from the first chamber toward the volume of hydraulic fluid in the second chamber.

Advantageously, in this case, there is provided, on the one hand an expansion braking valve for the low-pressure chamber, retained in the part of the first chamber defined between shock-absorber shaft piston, shock-absorber shaft and cylinder, and disposed opposite orifices for free passage of the hydraulic fluid, pierced in the piston of the shock-absorber shaft, the displacements of the valve being limited between this piston and an annular stop borne by the shock-absorber shaft and limiting the extension of the latter from the cylinder, and, on the other hand, an expansion braking valve for the high-pressure chamber, mounted in the first chamber of the cylinder and whose displacements are limited between the first transverse wall of the cylinder and a seat constituted by a shoulder inside the cylinder and a shoulder outside the first sleeve, facing one another, beyond the radial passage in the first sleeve toward the free end of the latter.

In a second particular form of embodiment, corresponding to a shock-absorber jack that fulfills the function of a lifting and super-lowering jack, the cylinder comprises a third chamber filled with hydraulic fluid, in which a jack shaft, mounted to slide in a leakproof fashion, defines, respectively, by its inner face and by its outer face, a lowering chamber and a lifting chamber which can be fed with hydraulic fluid to insure, respectively, the extension and the retraction of the jack shaft from or into the third chamber of the cylinder, which is separated from the second chamber by a second transverse wall of the cylinder, integral with a second sleeve having, at its base, a radial passage with a section very much larger than that of the permanent, compression-throttling orifice or orifices, and extending axially into the third chamber, the grooved shaft integral with the separator piston also passing through the second wall, and likewise being guided in the second sleeve, and having a second longitudinal groove, whereof the end, nearest the separator piston permits, when the shock absorber is in expanded position, communication between the third chamber of the cylinder and the volume of hydraulic fluid in the second chamber, through the radial passage at the base of the second sleeve, so that for compression loads higher than the normal loads, the separator piston and the grooved shaft are displaced, and the second groove extends on either side of the second transverse partition, to favor the flow of hydraulic fluid from the third chamber toward the volume of hydraulic fluid in the second chamber. Furthermore, a retraction piston, mounted to slide in leakproof fashion, on the one hand in the interior of the first chamber of the cylinder, and on the other hand, around the part of the shock absorber shaft inside the first chamber, defines, with the cylinder, a retraction chamber that can be fed with hydraulic fluid to apply the retraction piston against a stop integral with the shock-absorber shaft, and operate the retraction of the latter in the first chamber of the cylinder.

Advantageously in this second form of embodiment, an expansion braking valve for the low-pressure chamber is retained between the expanded head and an annular stop on the free end of the first sleeve, opposite the permanent free-passage orifices pierced in the expanded head, and an expansion braking valve for the high-pressure chamber is mounted in the third chamber of the cylinder, between the second transverse wall and a seat constituted by a shoulder inside the cylinder, and a shoulder outside the second sleeve, opposite one another, beyond the radial passage in the second sleeve, toward the free end of the latter.

And finally, the groove or grooves of the ground shaft can have progressive sections in order to adapt the passage orifices which they define to the rates of penetration of the shaft or shafts in the cylinder.

The present invention will be better understood with the aid of the particular examples of execution which will be described below, in non-limiting fashion, with reference to the attached figures in which:

BRIEF DESCRIPTION OF THE DRAWINGS

Referring to FIG. 1, the device comprises a shock absorber shaft 1 which can be fixed to the structure of the aerodyne by attachment 2 at its upper end, and is mounted to slide in leakproof fashion in a first chamber 3, filled with hydraulic fluid, hereinafter called oil, of a cylinder 4 which can be attached to the wheels or to the swing-arm of the undercarriage by its attachment 28. The end of shaft 1 received in chamber 3 of cylinder 4 bears a shock-absorber piston 5, mounted to slide on the inner face of chamber 3 and on the outer face of a sleeve 6, integral with a transverse wall 7 of cylinder 4, separating the first chamber 3 from a second chamber 8 in cylinder 4. Sleeve 6 extends axially into the first chamber 3, and its free end is shaped as an expanded head 9 sliding in the interior of shaft 1, which contains a chamber of gas under pressure 10 adjacent to a volume of oil in communication with the interior of chamber 3 through permanent orifices 11 of free passage, pierced in the expanded head 9 of sleeve 6, and through a permanent, compression-throttling orifice defined by piston 5 and a longitudinal groove 12 on the outer face of sleeve 6. Shaft 1 also has an annular stop 13 limiting its emergence from chamber 3, under the thrust of the chamber of gas under pressure 10. This stop 13 also limits the displacements of an expansion braking valve 14 for chamber 10, which is disposed opposite permanent orifices of free passage 15, pierced in piston 5, in the part of chamber 3 delimited by cylinder 4, shaft 1 and piston 5. Valve 14 is constituted by an annular disc pierced with diaphragms opposite orifices 15. A radial passage 16, of section very much larger than that of the permanent, compression-throttling orifice defined by groove 12 and piston 5, passes through the base of sleeve 6, which has an external, annular shoulder 17 just beyond passage 16. Opposite shoulder 17, cylinder 4 has an annular shoulder 18, the two shoulders 17 and 18 serving as a seat for an expansion braking valve 19 for a chamber of gas under pressure 20, delimited in the second chamber 8 of cylinder 4, by a separator piston 21, mounted to slide in leakproof fashion in this second chamber 8, the pressure in chamber 20 being higher than that in chamber 10. Valve 19, like valve 14, is constituted by a disc pierced with diaphragms, and its displacements are limited between its seat and the partition 7. Separator piston 21 bears a grooved shaft 22 which passes through partition 7 and is guided in sleeve 6 by an annular shoulder 23 inside this sleeve 6. Grooved shaft 22 has a first longitudinal groove 24 beyond shoulder 23 and terminating at the free end of grooved shaft 22, as well as a second longitudinal groove 25 at the base of shaft 22, whereof the end nearest the separator piston 21 connects the annular space, defined between sleeve 6 and shaft 22, with a volume of oil 26, defined in the second chamber 8 of the cylinder, between partition 7 and separator piston 21, thanks to the annular stop 27 in the latter. The device whose structure has just been described, works as follows: for landings taking place at normal vertical speeds on the order of 3 m/s, shaft 1 penetrates into cylinder 4, causing a throttling, as it passes, between piston 5 and sleeve 6, in groove 12, of the oil driven from chamber 3, and compresses the low-pressure chamber 10 in shaft 1. At the same time, valve 14 is raised from piston 5 and the filling of the part of chamber 3 receiving valve 14 is insured through orifices 15.

In FIG. 2, where the static curves of the force E as a function of the stroke C of such a two-chambered shock absorber are represented by S1 and S2, respectively for the low-pressure chamber 10 and the high-pressure chamber 20, the dynamic curve for a landing at a limit speed in normal use of 3 m/s is given by $V_N$. A dynamic absorption of the landing energy is therefore possible, under normal conditions over normal stroke $C_N$, corresponding to the maximum penetration of shaft 1 into cylinder 4.

Figure 1:
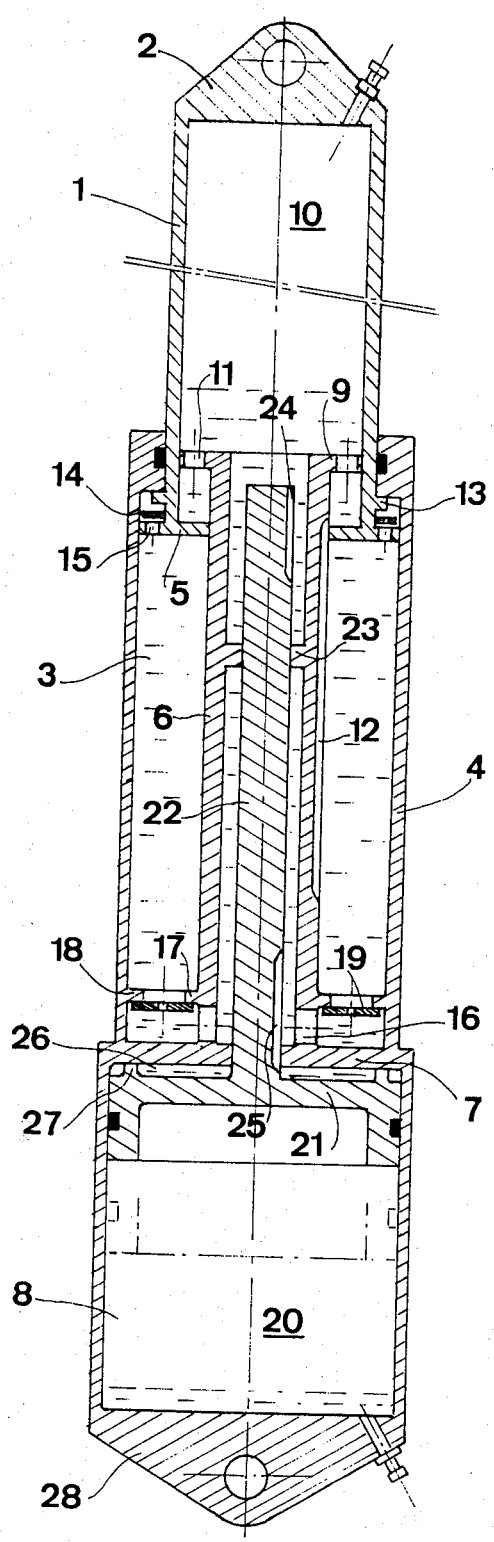
FIG. 1 is a view in axial section of a shock absorber to equip landing gears of aerodynes, and particularly helicopters.

The return to position of equilibrium under static load of the aerodyne, or the return to position of expanded abutment, as represented in FIG. 1, is reached with an expansion braking of low-pressure chamber 10 thanks to valve 14 applied against piston 5, which brakes the return of the oil in chamber 3 below piston 5.

Figure 2:
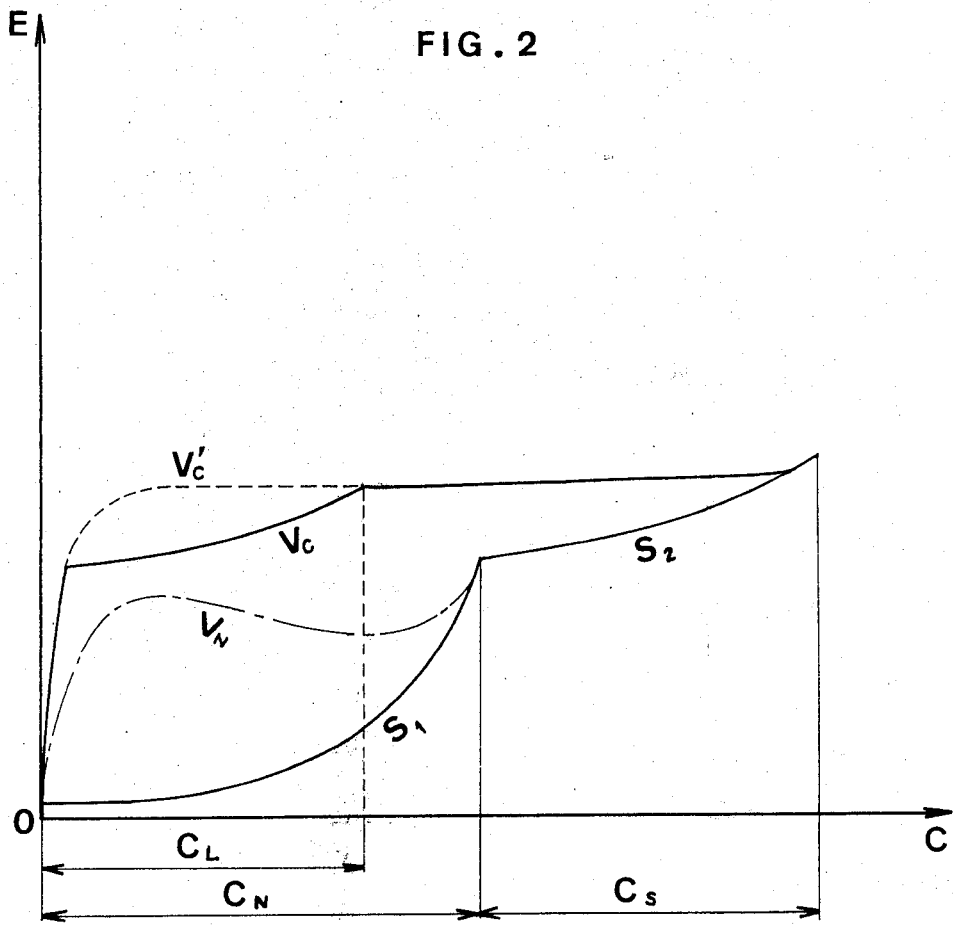
FIG. 2 is a graph representing the force as a function of the stroke in a shock absorber according to FIG. 1.

For a contact with the ground, made at a speed of 10 to 13 m/s, during a crash, for example, the throttling orifice defined by groove 12 is of insufficient section to permit a suitable flow of oil toward chamber 10. Consequently, the pressure will rise rapidly in chamber 3, and in the volume of oil 27, with which chamber 3 communicates through radial orifice 16 and groove 25, until it reaches the pressure of high-pressure chamber 20 in a second chamber or enclosure 8. Then separator piston 21 is displaced against the effect of high-pressure chamber 20, entraining with it the grooved shaft 22. Groove 25 then extends on either side of partition 7, and facilitates the passage of oil from chamber 3 toward space 26. After a certain stroke $C_L$ of separator piston 21 and grooved shaft 22, groove 24 comes opposite shoulder 23 inside sleeve 6. The oil can then flow freely from chamber 3 into shaft 1, passing through radial orifice 16 and the interior of sleeve 6. In this configuration, the device works as a limiter of force, and can complete the entire normal stroke $C_N$ augmented by an overstroke $C_S$, absorbing energy with no peak or force, as appears in curve $V_C$ in FIG. 2. By giving groove 25 a progressive section, it is even possible to obtain an absorption according to curve $V_C'$. In expansion, the braking is insured by valve 19 for the expansion of high-pressure chamber 20, and by valve 14 for the expansion of low-pressure chamber 10, as already explained above.

Figure 3:
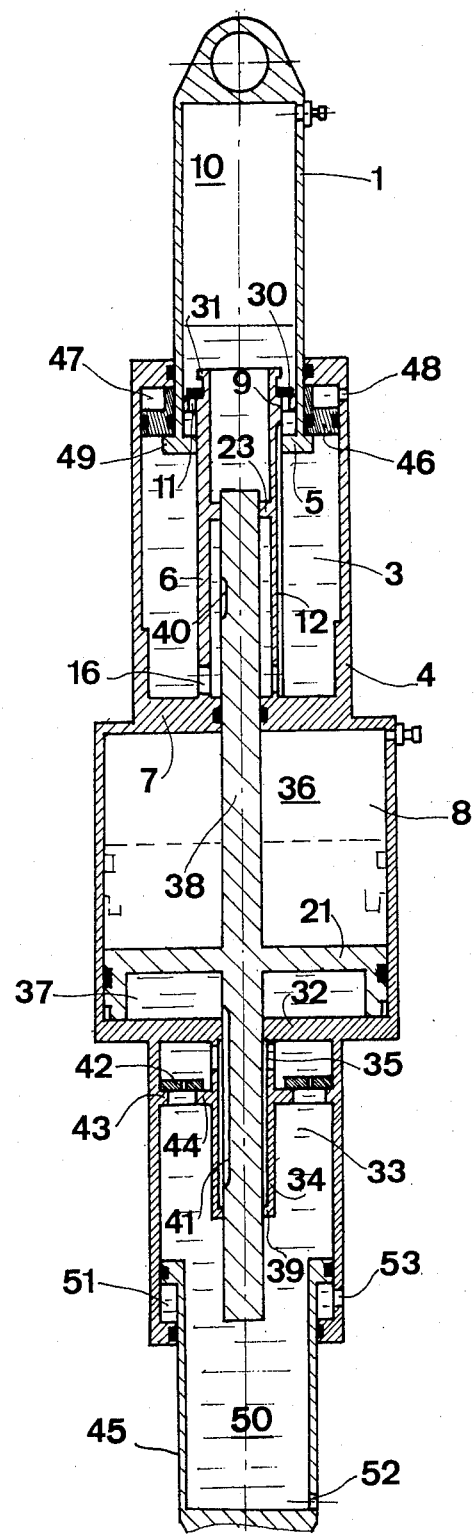
FIG. 3 is a view similar to FIG. 1 for a shock-absorber jack likewise for the landing gear of an aerodyne, and particularly a helicopter.

Referring to FIG. 3, in which the elements corresponding to the elements in FIG. 1 are provided with the same reference numerals, there is, once more, a shock absorber shaft 1, containing a low-pressure gas chamber 10, and mounted to slide in leakproof fashion in a chamber 3 of a cylinder 4, in which there extends axially a first sleeve 6, equipped on its outer face with a longitudinal groove 12, and borne by a first transverse wall 7 of cylinder 4. Groove 12 cooperates with a shock absorber piston 5, borne by shaft 1, to define a permanent compression-throttling orifice for the oil passing from chamber 3 into shaft 1, and loading the low-pressure chamber 10, after having raised an expansion braking valve 30 in this chamber 10, valve 30 being disposed opposite permanent orifices of free passage 11, pierced in the expanded head 9 of sleeve 6, on which shaft 1 slides. An annular stop 31, borne at the free end of sleeve 6, limits the displacements of valve 30. The first sleeve 6 has, at its base, a radial passage 16, of very much larger section than that of groove 12, insuring communication between the interior of sleeve 6 and chamber 3, separated by a partition formed by the first transverse wall 7 from a second chamber 8, separated in turn by a second transverse partition 32 from a third chamber 33 in cylinder 4, filled with oil, and into which there extends a second sleeve 34, borne by the second transverse partition or wall 32, and whereof the base has a radial passage 35, whose section is likewise very much larger than that of groove 12. A separator piston 21 is mounted to slide in leakproof fashion in chamber 8, and separates a high-pressure gas chamber 36 from a space for a volume of oil 37. Separator piston 21 bears a grooved shaft 38, passing through the second wall 32, and, in leakproof fashion, the first wall 7, and is guided in the first sleeve 6 by a shoulder 23 inside the latter, and in the second sleeve 34 by a shoulder 39 at the free end of the latter. Grooved shaft 38 has a first longitudinal groove 40 in its part situated between wall 7 and shoulder 23 when the device is in abutment, expanded, as well as a second longitudinal groove 41, in its part situated essentially in sleeve 34, but the end of groove 41 nearest the separator piston 21, terminates in space 37. A valve 42, for expansion braking of the high-pressure chamber 36 is disposed in the third chamber 33 between the second wall 32 and a seat constituted by two opposing annular shoulders, of which one, 43, is inside cylinder 4 and the other 44, is outside the second sleeve 34, the seat being disposed beyond the radial passage 35, toward the free end of sleeve 34. And finally a jack shaft 45 and a retraction piston 46 are mounted to slide in leakproof fashion, the first in the third chamber 33, and the second in the first chamber 3, and around the part of shock absorber shaft 1 in the interior of chamber 3. The retraction piston 46 defines, with cylinder 4 and shock absorber shaft 1, a retraction chamber 47, which can be fed with oil through orifice 48 to operate the retraction of shock absorber shaft 1 into chamber 3, by pressure of the retraction piston 46 against the annular stop 49 constituted by the external lateral edge of shock-absorber piston 5. By its internal face, the jack shaft 45 defines, with chamber 33, a lowering chamber 50 of the device, while its external face defines, with chamber 33, a lifting chamber 51; the chambers 50 and 51 can be fed with oil, respectively through orifices 52 and 53 to operate the extension or retraction of jack shafts 45 from or into chamber 33 of cylinder 4.

The device whose structure has just been described constitutes a shock-absorber jack, serving as a shock absorber under the same conditions as the device represented in FIG. 1, for normal landing speeds, but also making it possible either to raise the undercarriage when the lifting chamber 51, and retraction chamber 47, are fed with oil, chamber 50 being emptied, or to lower the undercarriage when the retraction and lifting chambers 47 and 51 are emptied and lowering chamber 50 is fed, or to lower the aerodyne further, when resting on its undercarriages by feeding lifting chamber 51 and emptying chamber 50, the position of the shock absorber under static load not being changed.

In the event of a crash, since the section of groove 12 is too small to permit a suitable damping by penetration of shock-absorber shaft 1 into cylinder 4, the pressure in chamber 50, and hence in the oil volume 37, communicating with the latter through radial passage 35 and the end of groove 41, rises rapidly until it reaches the level of pressure in high-pressure chamber 36. Then the separator piston 21 and grooved shaft 38 are displaced, loading the high-pressure chamber 36, which brings groove 41 on either side of partition 32. The oil can thus flow from chamber 40 toward volume 37, which allows a possible overrun if jack shaft 45 were already extended. After a given displacement of separator piston 21 and grooved shaft 38, groove 40 comes opposite shoulder 23 in sleeve 6, which permits the passage of oil from chamber 3 directly into shaft 1, bading the low-pressure chamber 10.

The shock-absorber jack in this configuration, works as a force limiter, transmitting no peak of force, and insuring an absorption of energy over all of the strokes of shock-absorber shaft 1 and jack shaft 45 in cylinder 4.

The devices according to the invention, in either shock-absorber version, or shock absorber-jack version, will advantageously equip the landing gears of helicopters; the low and high-pressure chambers can be filled with a gas, such as nitrogen, under pressure, or with elastomers, gums, deformable or friable materials fulfilling the same function.

We claim:

1. A suspension shock absorber for the landing gear of an aerodyne, comprising
    a cylinder including a first chamber filled with hydraulic fluid and a second chamber containing a gas under pressure and forming a high-pressure elastic return chamber;
    said cylinder including a transverse wall separating said first and said second chambers and a sleeve extending along the axial length of said cylinder spaced from an inner wall thereof to form a free space therebetween and connected with said transverse wall;
    a separator piston mounted to slide in a leak-proof fashion in said second chamber;
    a shock absorber shaft containing a low pressure elastic return chamber and including means mounting said shaft to slide in a leak-proof fashion in the interior of said first chamber;
    said shock absorber shaft including a shaft piston at the end thereof sliding in said free space in the interior of said first chamber between said inner wall and said sleeve and guided on said sleeve;
    at least one permanent compression-throttling orifice formed in said cylinder;
    a grooved shaft connected with said separator piston passing through said transverse wall;
    means guiding said grooved shaft in the interior of said sleeve, the base of said sleeve adjacent to said transverse wall having a radial passage larger in section than that of said at least one permanent compression-throttling orifice; and
    groove means on said grooved shaft displaceable with said separator piston so that in the event of penetration of said shock absorber shaft into said cylinder at a rate very much higher than that for which said at least one permanent compression-throttling orifice is calibrated, said separator piston is displaced in said second chamber against said gas under pressure forming said high pressure elastic return chamber by uncovering said radial passage for the passage therethrough of the hydraulic fluid in said first chamber through said groove means and conditioned for the rate of penetration of said shaft into said cylinder.

2. Shock absorber according to claim 1, wherein
    said guiding means includes a shoulder inside said sleeve and connected therewith;
    said grooved shaft being guided by said shoulder inside said sleeve;
    said grooved shaft having a longitudinal groove which following a displacement of said separator piston in compression, becomes positioned opposite said shoulder and defines therewith an orifice permitting the free passage of hydraulic fluid from said first chamber toward said low-pressure return chamber, and the hydraulic fluid flows through said radial passage at the base of said first sleeve.

3. The shock absorber according to claim 2,
    said grooved shaft having at its base a second or another longitudinal groove to permit communication between said first chamber and said second chamber through said radial passage in said sleeve, so that for compression loads higher than normal loads said separator piston and said grooved shaft are displaced such that said second longitudinal groove extends on either side of said transverse partition so as to permit the flow of the hydraulic fluid from said first chamber through said second longitudinal groove past said transverse partition wall into said second chamber above said separator piston.

4. The shock absorber according to claim 3,
    an annular stop on said shaft limiting the emergence thereof from said first chamber;
    said shaft piston having a first permanent orifice of free passage;
    a first expansion braking valve for said low-pressure chamber cooperating with said permanent orifice of free passage and controlled by said annular stop, said breaking valve including an annular disc pierced with diaphragms, the displacements of said valve being limited between said shaft piston and said annular stop;

a seat on the inside of said first cylinder and a shoulder on the outside of said sleeve forming therebetween a second permanent orifice of free passage formed between said sleeve and the inner wall of said first cylinder proximate to said transverse wall;

a second expansion braking valve between said transverse wall and said second permanent orifice having its displacement limited in one direction by said seal and said last-mentioned shoulder and said transverse wall.

5. The shock absorber according to claim 1 or 2, said groove means including a longitudinal groove on the outer face of said sleeve;

said sleeve having a free end with an expanded head thereat for guiding said sleeve internally of said shaft, said expanded head having a free passage permanent orifice;

said shaft piston together with said sleeve forming said at least one of said permanent compression-throttling orifices; and, said permanent compression-throttling orifice comprising the cooperation of said shaft piston, said longitudinal groove and said free passage permanent orifice.

6. The shock absorber according to claim 1, said grooved shaft having at its base a longitudinal groove to permit communication between said first chamber and said second chamber through said radial passage in said sleeve, so that for compression loads higher than normal loads said separator piston and said grooved shaft are displaced such that said longitudinal groove extends on either side of said transverse partition so as to permit the flow of the hydraulic fluid from said first chamber through said longitudinal groove past said transverse partition wall into said second chamber.

7. The shock absorber according to claim 1, said cylinder including a third chamber filled with hydraulic fluid; and, a jack shaft slidably leak-proofingly arranged in said third chamber including a lowering chamber and a lifting chamber, and means associated with said lowering chamber and said lifting chamber to feed hydraulic fluid thereinto to provide for the extension from and the retraction into said third chamber of said jack shaft.

8. The shock absorber according to claim 7, including a second transverse wall separating said third chamber from said second chamber;

a second sleeve extending from said transverse wall axially into said third chamber for guiding said grooved shaft, said sleeve having at its base thereof a radial passage of a section much larger than said permanent compression-throttling orifice;

said grooved shaft including a second groove means forming a longitudinal groove to provide communication between said second and said third chambers through said last-mentioned radial passage and extending into said second sleeve for the hydraulic fluid such that for compression loads higher than the normal loads said separator piston and said grooved shaft are displaced, and the longitudinal groove of said second groove means extends on either side of said second transverse partition to favor the flow of the hydraulic fluid from said third chamber toward the volume of hydraulic fluid in said second chamber.

9. The shock absorber according to claim 7, including a retraction piston between said first-mentioned sleeve and said inner wall of said first chamber slidably arranged therebetween in a leak-proof fashion, said retraction piston forming with said first chamber and said first-mentioned sleeve a retraction chamber;

a stop integral with said shock absorber shaft;

means to feed hydraulic fluid to said retraction chamber to apply said retraction piston against said stop, and operating the retraction of said shock absorber shaft into said first chamber of said cylinder.

10. The shock absorber according to claim 9, including an annular stop and an expanded head at a free end of said first-mentioned sleeve, permanent orifices of free passage pierced in said expanded head;

an expansion braking valve for said low pressure chamber retained between said annular stop and said expanded head on said first-mentioned sleeve opposite said permanent orifices;

two cooperating opposing shoulders in said third chamber, one on the inner wall of said third chamber and the other on said second sleeve beyond said radial passage thereof towards the free end thereof; and, an expansion braking valve for said high pressure chamber mounted in said third chamber for seating onto said shoulders within said third chamber between said second transverse wall and said cooperating shoulders.

11. A suspension shock absorber for the landing gear of an aerodyne, comprising a cylinder including two chambers one of which is filled with hydraulic fluid and said other containing a gas under pressure and forming a high-pressure elastic return chamber, said cylinder including a first transverse wall separating said chambers;

a sleeve extending along the axial length of said cylinder spaced from an inner wall thereof to form a free space therebetween and connected with said transverse wall;

a separator piston mounted to slide in a leak-proof fashion in said other chamber;

a shock absorber shaft having a low pressure elastic return chamber means mounting said shaft to slide in a leak-proof fashion in the interior of said one chamber, said shaft including a shaft piston sliding in the interior of said one chamber in said free space and guided on said sleeve;

at least one permanent compression-throttling orifice arranged in said cylinder cooperating with said elastic return chamber;

a grooved shaft connected with said separator piston passing through said transverse wall;

means guiding said grooved shaft in the interior of said sleeve, the base of said sleeve adjacent to said transverse wall having a radial passage larger in section than that of said at least one permanent compression-throttling orifice; and, grooves on said grooved shaft displaceable with said separator piston so that in the event of penetration of said shock absorber shaft into said cylinder at a rate very much higher than that for which said at least one permanent compression-throttling orifice is calibrated, said separator piston is displaced in said other chamber against said gas under pressure forming said high pressure elastic return chamber by uncovering said radial passage for the passage thereof of the hydraulic fluid in said one chamber through said groove and conditioned for the rate of penetration of said shaft into said cylinder.

12. The shock absorber according to claim 6, 3, 8 or 11, wherein the groove or grooves of said grooved shaft are of a progressive section in order to adapt the orifices of passage which they define to the rates of pentration of said shaft into said cylinder.

* * * * *